(12) United States Patent
Kitazume

(10) Patent No.: US 9,050,996 B2
(45) Date of Patent: Jun. 9, 2015

(54) CONTROL DEVICE FOR ELECTRIC POWER STEERING APPARATUS

(75) Inventor: Tetsuya Kitazume, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 13/521,082

(22) PCT Filed: May 11, 2012

(86) PCT No.: PCT/JP2012/062153
§ 371 (c)(1),
(2), (4) Date: Aug. 14, 2012

(87) PCT Pub. No.: WO2012/169311
PCT Pub. Date: Dec. 13, 2012

(65) Prior Publication Data
US 2013/0066524 A1    Mar. 14, 2013

(30) Foreign Application Priority Data

Jun. 8, 2011  (JP) ................... 2011-127867

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |

(Continued)

(52) U.S. Cl.
CPC ............... *B62D 6/00* (2013.01); *B62D 5/0463* (2013.01); *B62D 5/0496* (2013.01)

(58) Field of Classification Search
CPC ...... B62D 5/0463; B62D 6/003; B62D 5/008; B62D 7/159; B62D 6/002
USPC ...................... 701/42, 41, 43, 44; 307/98, 99; 318/650, 2, 759, 760, 761, 762; 323/325, 236; 327/535, 536, 537, 538, 327/539, 540, 541, 542, 543, 544, 545, 327/546; 388/806, 815, 821, 822, 823, 833, 388/854, 811, 819, 829, 831; 363/8, 71; 180/442, 443, 444, 445, 446, 6.2; 74/543, 552, 554, 555, 556, 557, 558, 74/558.5

See application file for complete search history.

(56) References Cited

U.S. PATENT DOCUMENTS 3,577,050 A * 5/1971 Ringland et al. ............... 318/146
3,584,276 A * 6/1971 Ringland et al. ............... 318/721

(Continued)

FOREIGN PATENT DOCUMENTS

| JP | 11-27951 A | 1/1999 |
|---|---|---|
| JP | 2006-199140 A | 8/2006 |

(Continued)

*Primary Examiner* — John Q Nguyen
*Assistant Examiner* — James E Stroud
(74) *Attorney, Agent, or Firm* — Sughrue Mion, PLLC

(57) ABSTRACT

A control apparatus for an electric power steering apparatus, including a section that calculates a dead time characteristic value; a section that determines a steering status; a gain section that varies a gain of the dead time characteristic value in accordance with a determination of the steering status; a section that switches polarity determining methods in accordance with the determination of the steering status and determines a polarity on the basis of a detected current of a motor, a current command value or a model current; a temperature sensor that detects a temperature of an inverter; a calculating section that calculates a dead time temperature correction value corresponding to the temperature; and a processing section that calculates and processes the dead time temperature correction value with respect to a dead time compensation value with polarity based on an output of the gain section and outputs a dead time compensation value.

8 Claims, 10 Drawing Sheets

(51) Int. Cl.
 *G05D 1/00* (2006.01)
 *G06F 7/00* (2006.01)
 *G06F 17/00* (2006.01)
 *G06F 19/00* (2011.01)
 *B62D 5/04* (2006.01)

(56) References Cited

U.S. PATENT DOCUMENTS

| | | | | |
|---|---|---|---|---|
| 3,720,863 | A | * | 3/1973 | Ringland et al. ............... 318/52 |
| 3,845,372 | A | * | 10/1974 | Ringland et al. ............. 318/779 |
| 4,471,280 | A | * | 9/1984 | Stack ............................ 318/586 |
| 7,604,088 | B2 | * | 10/2009 | Nishizaki et al. ............. 180/446 |
| 2008/0201041 | A1 | * | 8/2008 | Jiang ................................ 701/42 |
| 2008/0255729 | A1 | * | 10/2008 | Ichinose et al. ................. 701/42 |
| 2010/0017063 | A1 | * | 1/2010 | Maeda ............................ 701/42 |

FOREIGN PATENT DOCUMENTS

| | | |
|---|---|---|
| JP | 2009-5485 A | 1/2009 |
| JP | 2009165279 A | 7/2009 |
| JP | 2010057242 A | 3/2010 |

\* cited by examiner

PRIOR ART

PRIOR ART

CONTROL DEVICE FOR ELECTRIC POWER STEERING APPARATUS

CROSS REFERENCE TO RELATED APPLICATIONS

This application is a National Stage of International Application No. PCT/JP2012/062153 filed May 11, 2012, claiming priority based on Japanese Patent Application No. 2011-127867 filed Jun. 8, 2011, the contents of all of which are incorporated herein by reference in their entirety.

TECHNICAL FIELD

The present invention relates to a control device for an electric power steering apparatus that provides a steering system of a vehicle with a steering assist force generated by a motor, and in particular to a control device for an electric power steering apparatus that improves dead time compensation of an inverter for a motor drive depending on a steering status and an inverter temperature.

BACKGROUND ART

An electric power steering apparatus that energizes a steering apparatus of a vehicle by using a rotational torque of a motor as an assist torque, applies a driving force of the motor as the assist torque to a steering shaft or a rack shaft by means of a transmission mechanism such as gears or a belt through a reduction mechanism. And then, in order to supply a current to the motor so that the motor generates a desired torque, an inverter is used in a motor drive circuit.

A general configuration of a conventional electric power steering apparatus will be described with reference to FIG. 1. As shown in FIG. 1, a column shaft (a steering shaft) 2 connected to a steering wheel (handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit 100 for controlling the electric power steering apparatus from a battery 13, and an ignition key signal is inputted into the control unit 100 through an ignition key 11. The control unit 100 calculates a current command value of an assist (steering assist) command based on a steering torque T detected by the torque sensor 10 and a velocity V detected by a velocity sensor 12, and controls a current supplied to the motor 20 based on a voltage command value E obtained by performing compensation and so on with respect to the current command value in a current control section. Furthermore, it is also possible to receive the velocity V from a CAN (Controller Area Network) and so on.

The control unit 100 mainly comprises a CPU (or an MPU or an MCU), and general functions performed by programs within the CPU are shown in FIG. 2.

Functions and operations of the control unit 100 will be described with reference to FIG. 2. As shown in FIG. 2, the steering torque T detected by the torque sensor 10 and the velocity V detected by the velocity sensor 12 are inputted into a current command value calculating section 101. The current command value calculating section 101 decides a current command value Iref1 that is the desired value of the current supplied to the motor 20 based on the steering torque T and the velocity V and by means of an assist map and so on. The current command value Iref1 is added in an addition section 102A and then the added value is inputted into a current limiting section 103 as a current command value Iref2. A current command value Iref3 that is limited the maximum current, is inputted into a subtraction section 102B, and a deviation Iref4 (=Iref3−Im) between the current command value Iref3 and a motor current value Im that is fed back, is calculated. The deviation Iref4 is inputted into a PI control section 104 serving as the current control section. The voltage command value E that characteristic improvement is performed in the PI control section 104, is inputted into a PWM control section 105. Furthermore, the motor 20 is PWM-driven through an inverter 106 serving as a drive section. The current value Im of the motor 20 is detected by a motor current detector 107 and is fed back to the subtraction section 102B. In general, the inverter 106 uses FETs as switching elements and is comprised of a bridge circuit of FETs.

Further, a compensation signal CM from a compensation section 110 is added in the addition section 102A, and the compensation of the system is performed by the addition of the compensation signal CM so as to improve a convergence, an inertia characteristic and so on. The compensation section 110 adds a self-aligning torque (SAT) 113 and an inertia 112 in an addition section 114, further adds the result of addition performed in the addition section 114 and a convergence 111 in an addition section 115, and then outputs the result of addition performed in the addition section 115 as the compensation signal CM.

In the case that the motor 20 is a 3-phase brushless motor, details of the PWM control section 105 and the inverter 106 become a configuration such as shown in FIG. 3. That is, the PWM control section 105 comprises a duty calculating section 105A that calculates PWM duty command values D1~D6 of three phases according to a given expression based on the voltage command value E, dead time sections 105C1~105C3 that set a dead time with respect to the PWM duty command values D4~D6 respectively, and a gate driving section 105B that drives each gate of FET1~FET3 by the PWM duty command values D1~D3 and simultaneously switches on/off after driving each gate of FET4~FET6 by PWM duty command values D4d~D6d that the dead time from the dead time sections 105C1~105C3 is set respectively. The inverter 106 comprises a three-phase bridge having top and bottom arms comprised of FET1 and FET4, top and bottom arms comprised of FET2 and FET5, and top and bottom arms comprised of FET3 and FET6, and drives the motor 20 by being switched ON/OFF based on the PWM duty command values D1~D3 and D4d~D6d.

Here, the reason for setting the dead times by the dead time sections 105C1~105C3 is the following.

Every the top and bottom arms that comprise the inverter 106, for example, FET1 and FET4 alternately repeat ON/OFF, in the same way, FET2 and FET5 alternately repeat ON/OFF, and also FET3 and FET6 alternately repeat ON/OFF. However, FET is not an ideal switch and requires a turn on time Ton and a turn off time Toff without instantly performing ON/OFF as instructed by gate signals. As a result, for example, when an ON-instruction for FET1 and an OFF-instruction for FET4 are issued at the same time, FET1 and FET4 become ON at the same time and there is a problem that the top and bottom arms short. Therefore, in order not to generate a flow-through current by turning FET1 and FET4 on at the same time, in the case of giving an OFF-signal to the gate drive section 105B, by giving an ON-signal to the gate drive section 105B after the elapse of a given time called the dead time in the dead time section 105C1 without giving an ON-signal to the gate drive section 105B immediately, short of the top and bottom arms comprised of FET1 and FET4 can be prevented. In the same way, this is applied to other FET2~FET6 as well.

However, existence of the above dead time becomes a cause that causes problems such as insufficient torque and torque ripple for control of the electric power steering apparatus.

At first, the dead time, the turn on time and the turn off time will be described with reference to FIG. 4. The duty command value D1 (D4) from the duty calculating section 105A shown in FIG. 4(A), is set as an ON/OFF-signal with respect to FET1 and FET4. However actually, a gate signal K1 shown in FIG. 4(B) is given to FET1, and a gate signal K2 shown in FIG. 4(C) is given to FET4. That is, with respect to both of the gate signals K1 and K2, a dead time Td is ensured. A terminal voltage comprised of FET1 and FET4 is set as Van shown in FIG. 4(D). Even the ON-signal based on the gate signal K1 is given, FET1 turns on after the elapse of the turn on time Ton without performing ON immediately. Further, even the OFF-signal is given, FET1 turns off after the elapse of the turn off time Toff without performing OFF immediately. In addition, "Vdc" is a power-supply voltage (a voltage of the battery 13) of the inverter 106. Therefore, a total delay time Ttot is indicated by the following Expression 1.

$$Ttot=Td+Ton-Toff \quad\quad (\text{Expression 1})$$

Next, influences on the electric power steering apparatus by the dead time Td will be described.

Firstly, an influence on the voltage is as follows. As shown in FIG. 4, with respect to the ideal gate signals (D1, D4), the actual gate signals K1 and K2 become signals that are different from the ideal gate signals due to the influence of the dead time Td. As a result, although voltage distortion occurs, in the case that the direction of the motor current Im is positive (i.e. in the case that the direction of the current flows from the power supply to the motor), that distortion voltage ΔV becomes the following Expression 2, and in the case that the direction of the motor current Im is negative (i.e. in the case that the direction of the current flows from the motor to the power supply), that distortion voltage ΔV becomes the following Expression 3.

$$-\Delta V=-(Ttot/Ts)\cdot(Vdc/2) \quad\quad (\text{Expression 2})$$

where "Ts" is an inverse number (Ts=1/fs) of a PWM frequency fs in the case of PWM-controlling the inverter 106.

$$\Delta V=(Ttot/Ts)\cdot(Vdc/2) \quad\quad (\text{Expression 3})$$

By representing the above Expressions 2 and 3 in one expression, the following Expression 4 can be obtained.

$$\Delta V=\text{sign}(Im)\cdot(Ttot/Ts)\cdot(Vdc/2) \quad\quad (\text{Expression 4})$$

where sign (Im) represents the polarity of the motor current Im.

It is derived from the above Expression 4 that when the PWM frequency fs is high and the power-supply voltage Vdc is large, as the distortion voltage ΔV is high, the influence of the dead time Td greatly appears.

Although the influence of the dead time Td with respect to the voltage distortion is described as above, even with respect to the current or the torque, there are undesirable influences caused by the dead time Td. With respect to current distortion, when the current changes from positive to negative or from negative to positive, the dead time Td causes a zero clamping phenomenon (i.e. a phenomenon that the current sticks to the vicinity of zero). This is because, since a load (the motor) is inductance, there is a trend that voltage drop caused by the dead time Td keeps the current at zero.

Further, the influence of the dead time Td with respect to the torque, appears in an insufficient output torque and an increase in torque ripple. That is, the current distortion generates a low order harmonics, and that is conducive to the increase in the torque ripple. Moreover, since the actual current that is affected by the dead time Td, becomes smaller than the ideal current, the lack of output torque occurs.

In order to prevent such an undesirable influence of the dead time Td, various measures (so called "dead time compensation") are considered. The basic concept is to compensate the distortion voltage ΔV shown in the above Expression 4. Therefore, the compensating expression 4 is to correct by means of a dead time correction value (voltage) Δu shown in the following Expression 5.

$$\Delta u=\text{sign}(Im)\cdot(Ttot/Ts)\cdot(Vdc/2) \quad\quad (\text{Expression 5})$$

In the dead time compensation, there is a problem that it is impossible to accurately detect the polarity sign(Im) of the current Im. When measuring the polarity of the current Im, noises of the PWM control and the above-described zero clamping phenomenon of the current make it difficult to accurately measure the polarity of the current Im.

Furthermore, in the electric power steering apparatus, in a straight running, with respect to characteristics of the vicinity of a steering neutral position, a fine control such as repeating a steering reverse with a weak current is required constantly. In particular, since it is a straight running state, for example, in running at a high speed, road vibration being transmitted to the steering wheel is small, thus unstable elements of the assist easily transmit as vibrations.

THE LIST OF PRIOR ART DOCUMENTS

Patent Documents

Patent Document 1: Japanese Patent Application Laid-Open No. 2006-199140
Patent Document 2: Japanese Patent Application Laid-Open No. H11-27951
Patent Document 3: Japanese Patent Application Laid-Open No. 2009-5485

SUMMARY OF THE INVENTION

Problems to be Solved by the Invention

As a means for solving the above-described problems, a control device for an electric power steering apparatus disclosed in Japanese Patent Application Laid-Open No. 2006-199140 (Patent Document 1), is proposed. In this control device, by calculating compensation amount of the dead time compensation and the sign of the current based on the current and steering conditions and adding to the voltage command value, in accordance with various steering conditions and loading statuses, an optimal dead time compensation value is set from the view of steering feeling.

With respect to setting a dead time of an inverter, although a predetermined value is generally set in a CPU (such as a microcomputer), a value of the actual dead time varies with a temperature change of the switching element (FET). However, in the device of Patent Document 1, since correcting the dead time compensation amount based on steering conditions does not consider the temperature change of the switching element, in the case that the actual dead time changed with the temperature change, the dead time becomes disaccording with the dead time compensation amount, thus there is a possibility that the current distortion occurs without being able to perform a suitable compensation and the torque ripple gets worse. In particular, outside the vicinity of the steering neutral position, although wanting to accord the dead time with the dead time compensation amount and improve the responsibility of the steering, when using a compensation amount that is set at an ordinary temperature, for example, under a high-temperature environment, there are characteristics that the compensation amount becomes over compensated, thus there is a possibility that the current distortion occurs and the torque ripple occurs easily.

Further, although an inverter control apparatus disclosed in Japanese Patent Application Laid-Open No. H11-27951 (Patent Document 2), corrects the dead time compensation amount based on a thermistor temperature, since the inverter control apparatus does not relate to an electric power steering apparatus, it is not completely considered to correct the dead time compensation amount based on steering conditions. Thus, it is impossible to apply to the electric power steering apparatus.

Moreover, although a dead time correction method disclosed in Japanese Patent Application Laid-Open No. 2009-5485 (Patent Document 3), corrects a dead time set value itself based on a temperature detected by a temperature change detection means, this dead time correction method is a method for suppressing an increase in an apparatus temperature, and switches the width of the dead time depending on a temperature change with a flow-through current at the time of an ON/OFF-switching of top and bottom arms of a motor drive circuit. Therefore, this dead time correction method is not a method that considers the environment of a vehicle, and does not become a substantive solution of the torque ripple.

The present invention has been developed in view of the above-described circumstances, and an object of the present invention is to provide a control device for an electric power steering apparatus that suppresses disaccord between the actual dead time and the dead time compensation value by correcting the dead time compensation value based on the temperature of the switching element (the inverter) and reduces the distortion of the motor current and the occurrence of the torque ripple, and simultaneously reduces the occurrence of noises by performing a dead time compensation corresponding to the steering conditions and constantly obtains good steering performances even under an environment from a low temperature to a high temperature.

Means for Solving the Problems

The present invention relates to a control device for an electric power steering apparatus that controls a motor providing a steering mechanism with a steering assist force by means of an inverter based on a current command value calculated based on a steering torque generated in a steering shaft and a voltage command value from a current control section inputting said current command value, the above-described object of the present invention is achieved by that comprising: a dead time characteristic section that calculates a dead time characteristic value based on said current command value; a steering status determining section that determines a steering status of a steering wheel; a gain section that varies a gain of said dead time characteristic value in accordance with a determination of said steering status determining section; a polarity determining section that switches polarity determining methods in accordance with said determination of said steering status determining section and simultaneously determines a polarity based on a detected current of said motor, said current command value, or a model current based on said current command value; a temperature sensor that detects a temperature of said inverter; a dead time temperature correction value calculating section that calculates a dead time temperature correction value corresponding to said temperature; and a calculation processing section that calculates and processes said dead time temperature correction value with respect to a dead time compensation value with polarity that is determined by said polarity determining section based on an output of said gain section and outputs a dead time compensation value, wherein a dead time of said inverter is compensated by adding said dead time compensation value to said voltage command value.

Further, the above-described object of the present invention is more effectively achieved by that wherein at a time of a high temperature of said inverter, decreasing said dead time compensation value, and at a time of a low temperature of said inverter, increasing said dead time compensation value; or wherein said dead time temperature correction value calculating section is comprised of a temperature correction limit value calculating section that performs calculation of a temperature correction limit value, and said calculation processing section is comprised of a temperature-sensitive limiter; or wherein said dead time temperature correction value calculating section is comprised of a temperature correction subtraction value calculating section that performs calculation of a temperature correction subtraction value, and said calculation processing section is comprised of a subtraction section; or wherein said dead time temperature correction value calculating section is comprised of a temperature correction gain calculating section that performs calculation of a temperature correction gain, and said calculation processing section is comprised of a multiplication section.

Effects of the Invention

According to a control device for an electric power steering apparatus of the present invention, since performing the dead time compensation with respect to the voltage command value by means of a dead time compensation value considering the temperature of the inverter, being different from the dead time compensation based on a measured current including noises, it is possible to provide a high performance control device for an electric power steering apparatus that distortions of the motor voltage and the motor current are small and furthermore regardless of the temperature change, constantly performs the dead time compensation with small torque ripple.

Further, since performing the dead time compensation that also considers a motor current change corresponding to a steering status, being different from the dead time compensation based on only a fixed value, it is possible that distortions of the motor voltage and the motor current are small, and it is possible to perform the dead time compensation with the small torque ripple depending on the steering status.

BRIEF DESCRIPTION OF THE DRAWINGS

In the accompanying drawings.

MODE FOR CARRYING OUT THE INVENTION

Figure 5:
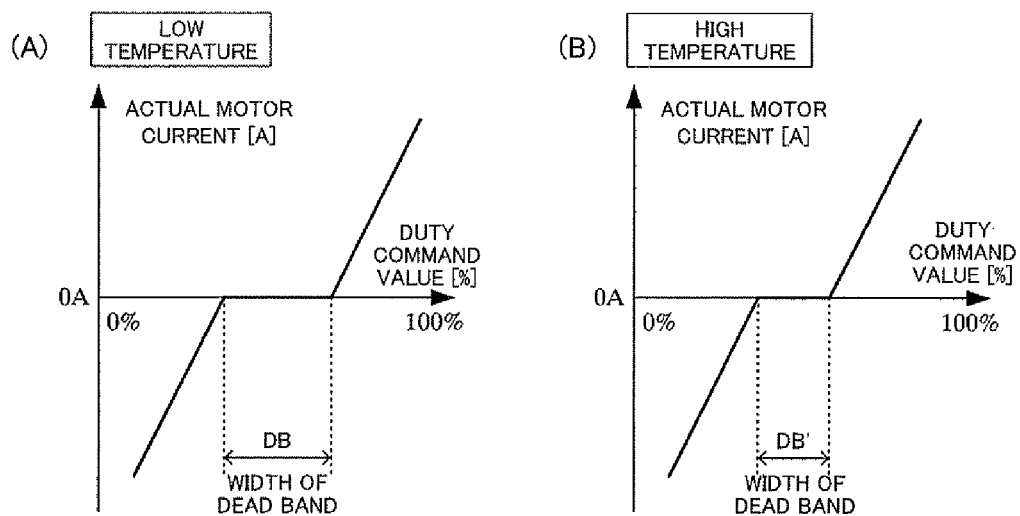
FIG. 5 shows a low temperature characteristic diagram and a high temperature characteristic diagram that illustrate examples of temperature variation of a dead band of a switching element.
Figure 6:
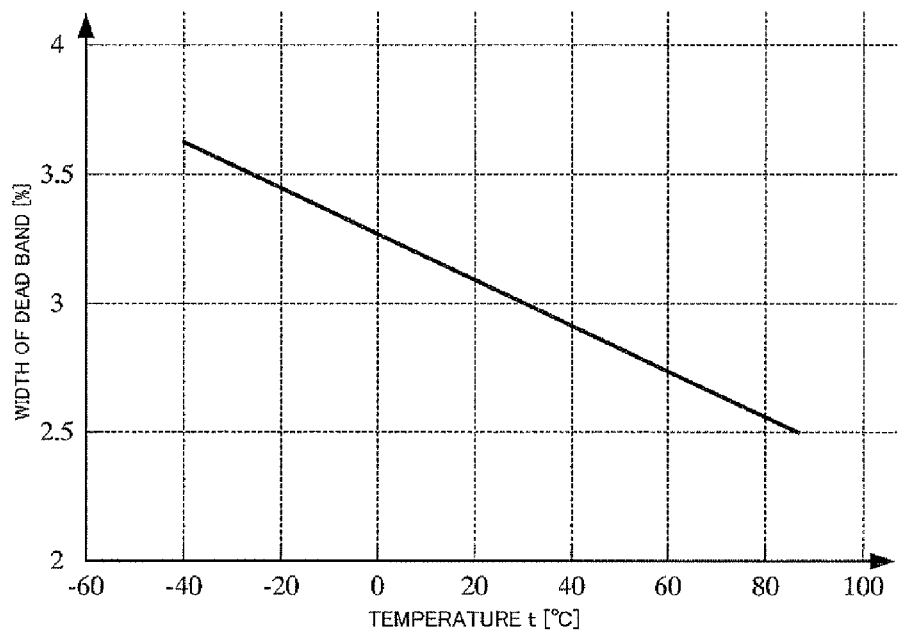
FIG. 6 is a characteristic diagram showing one example of temperature variation of the width of a dead band of a switching element.

A dead time that is given for preventing a flow-through current of an inverter comprised of switching elements (such as FETs, IGBTs, TRIACs and so on), is generated as a characteristic distortion (a dead band DB) of an output current with respect to a duty command value at the time of zero ampere cross, for example as shown in FIG. 5(A). However, when this dead band DB is set as a dead band in the case of a low temperature (for example 0° C.) as shown in FIG. 5(A), in the case that the temperature changes and becomes a high temperature (for example 40° C.), the dead band becomes narrow as shown in FIG. 5(B) (the dead band DB' (<DB)). In general, due to the characteristics of the switching elements, the width of the dead band widens when the temperature becomes low, and the width of the dead band narrows when the temperature becomes high. Temperature characteristic of the width of the dead band is shown in FIG. 6 in the case of FETs configuring the inverter. That is, when "t" represents the temperature of the inverter (FETs), "C" represents a temperature coefficient, and $DB_0$ represents the width of the dead band at 0° C., the width of the actual dead band DB can be represented by the following Expression 6.

$$DB = -C \cdot t + DB_0 \quad \text{(Expression 6)}$$

Figure 7:
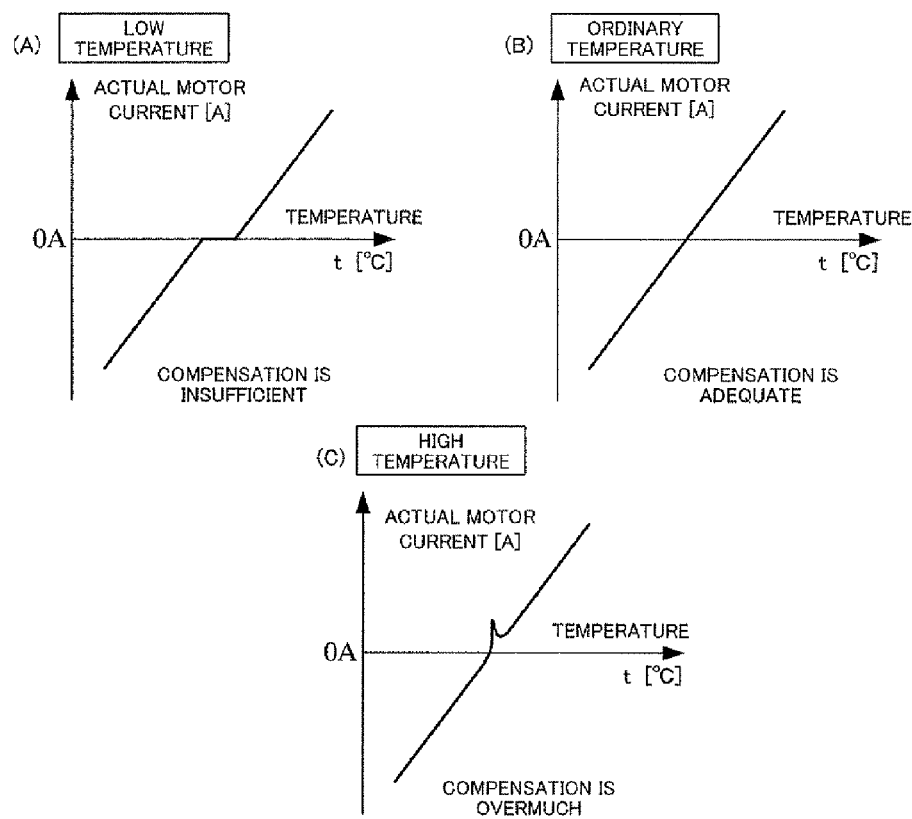
FIG. 7 shows characteristic diagrams (in the case that compensation is insufficient, in the case that compensation is adequate, and in the case that compensation is overmuch) that illustrate characteristics at the point of current zero crossing caused by dead time compensation.

Here, the dead time compensation is to apply a compensation voltage with a timing of zero ampere cross, and is to eliminate the characteristic distortions (DB, DB') of the output current that are shown in FIG. 5(A) and FIG. 5(B). That is, by setting the width of the actual dead band DB expressed in Expression 6 as the dead time compensation amount, it is possible to obtain a characteristic without a current distortion shown in FIG. 7(B). However, when correcting the dead time compensation amount by the steering conditions only, since the width of the actual dead band DB varies with the temperature, at the time of the temperature decline, as shown in FIG. 7(A), the compensation becomes insufficient, on the other hand, at the time of the temperature rise, as shown in FIG. 7(C), the compensation becomes overmuch.

The present invention performs the calculation of the dead time compensation value in accordance with the temperature of the inverter and the steering status such as turning, returning or release of the steering wheel, and simultaneously performs the dead time compensation with respect to the voltage command value of the inverter that drives the motor. As a result, even the temperature varies (−40~80° C.), it is possible that distortions of the motor voltage and the motor current are constantly small, and it is possible to realize a high-performance dead time compensation with the small torque ripple.

Hereinafter, embodiments of the present invention will be described with reference to the accompanying drawings.

Figure 1:
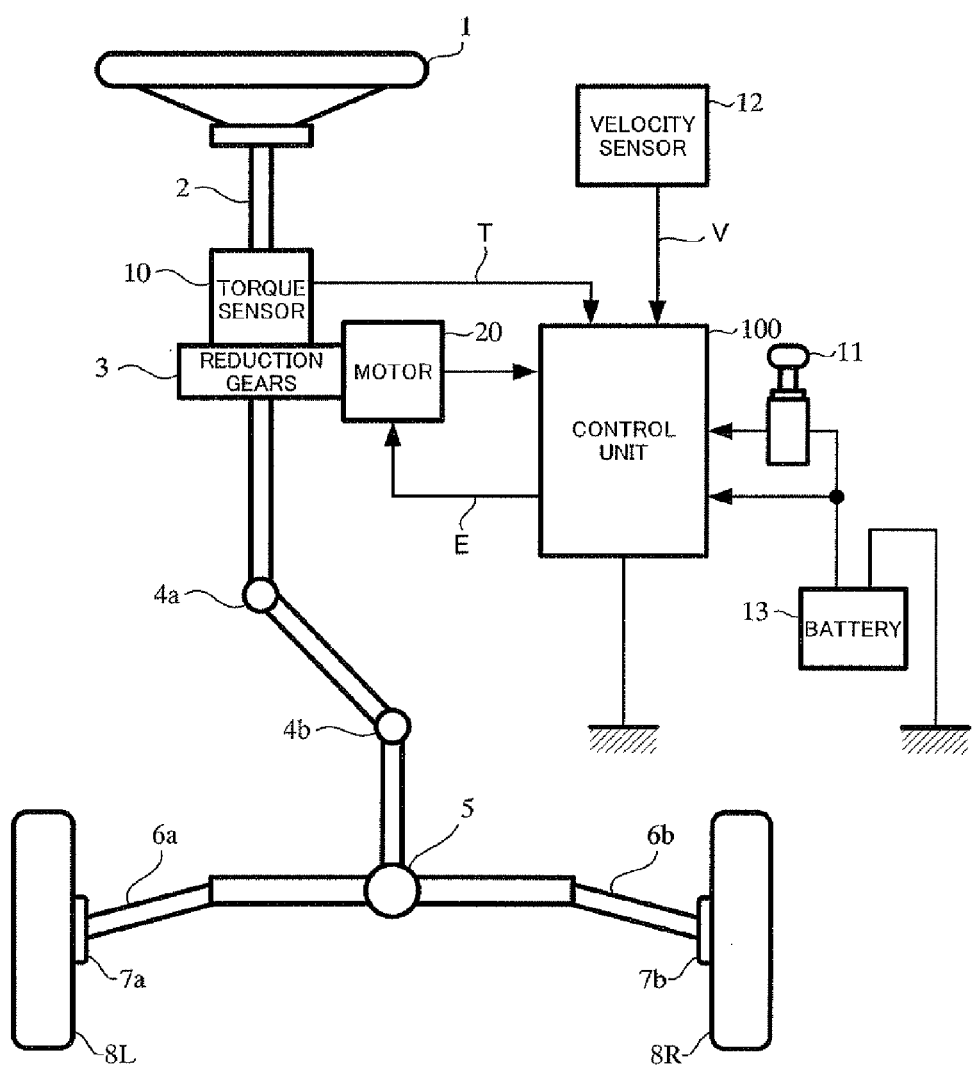
FIG. 1 is a diagram illustrating a configuration example of a general electric power steering apparatus.
Figure 2:
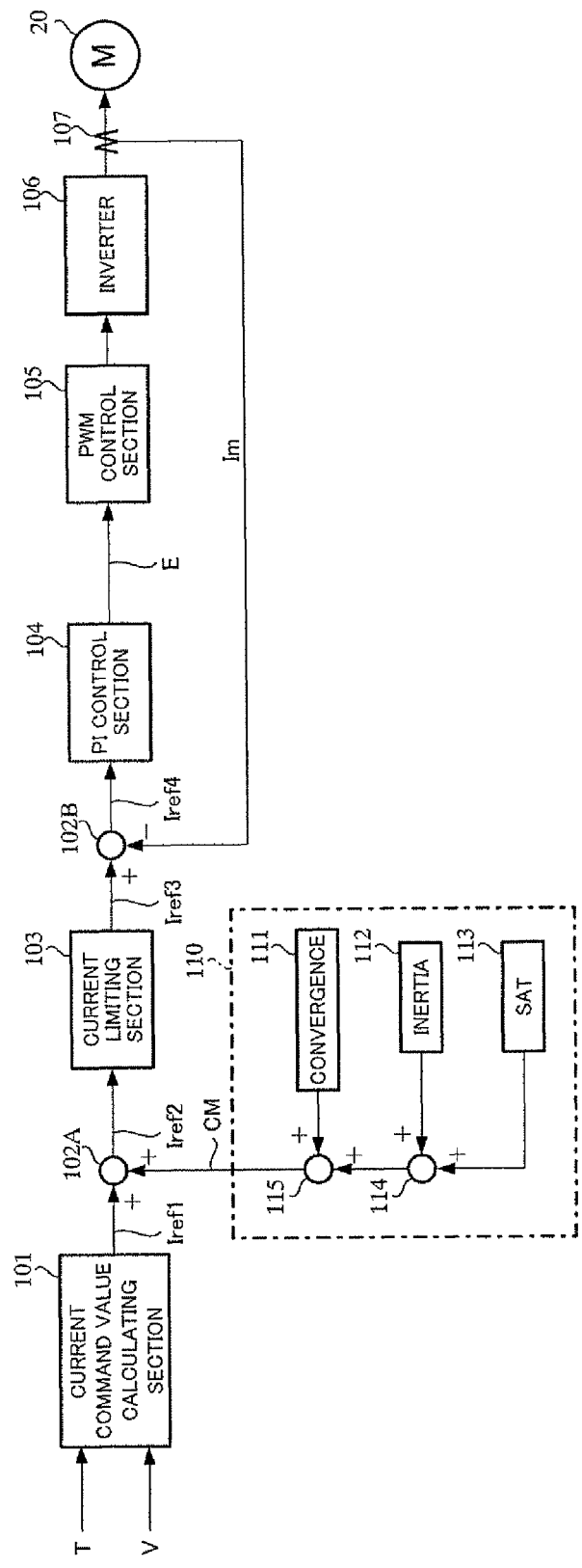
FIG. 2 is a block diagram showing an example of a control unit.
Figure 3:
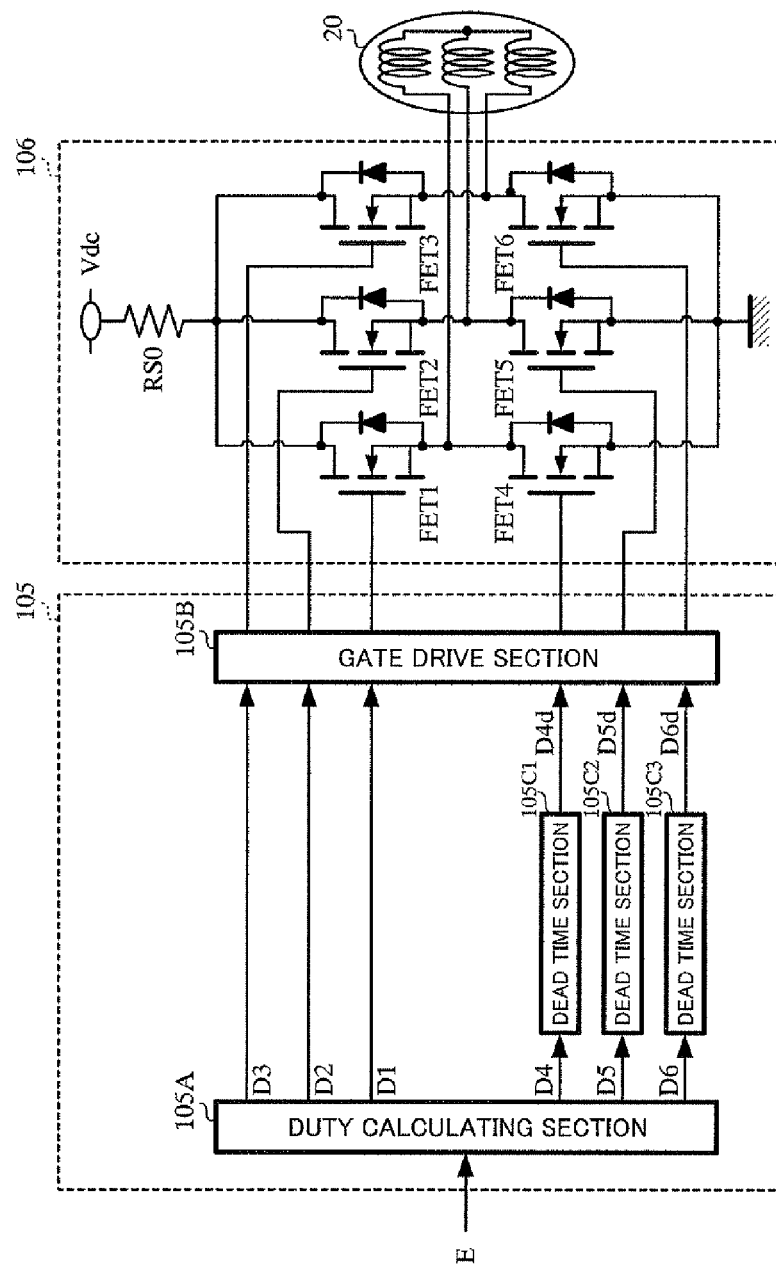
FIG. 3 is a wiring diagram showing a configuration example of a PWM control section and an inverter.
Figure 4:
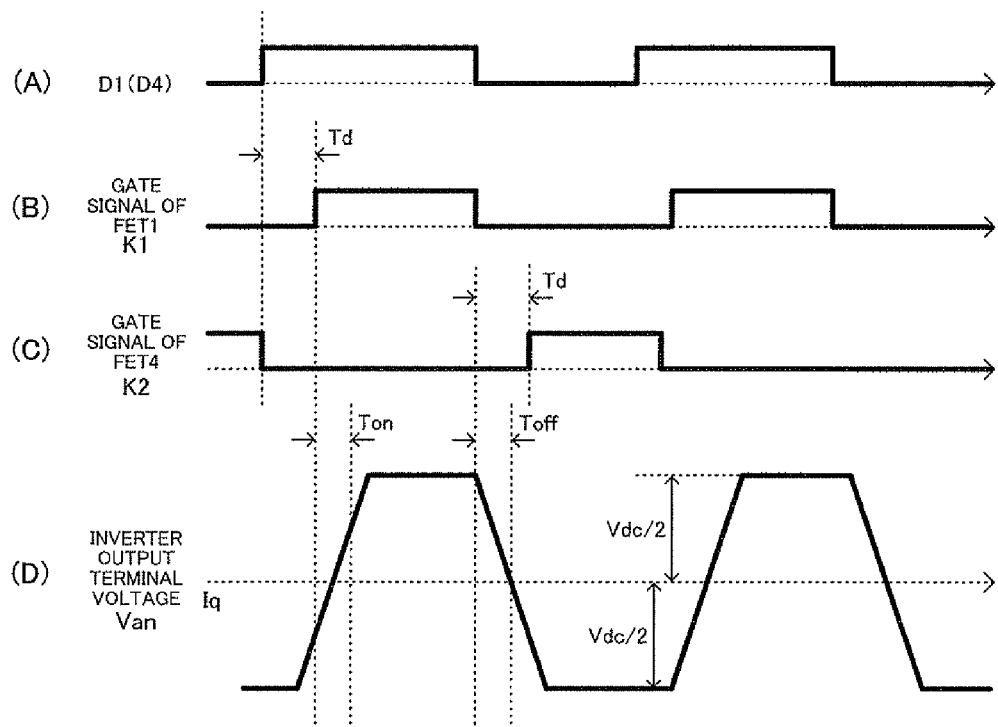
FIG. 4 shows time charts that illustrate relationships among a dead time, a turn on time and a turn off time.
Figure 8:
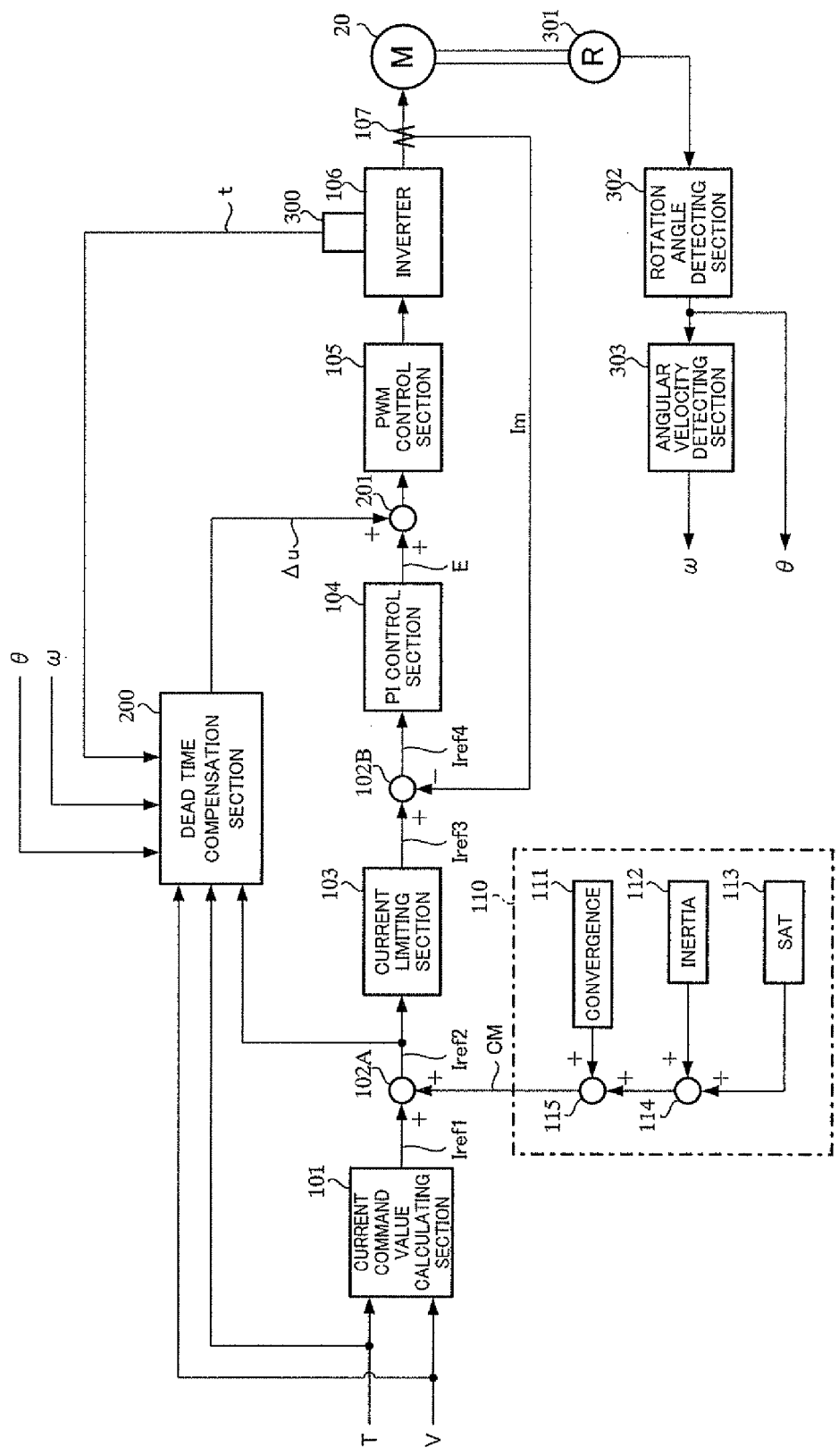
FIG. 8 is a block diagram showing a configuration example of the present invention.

FIG. 8 shows a configuration example of the present invention corresponding to FIG. 2. As shown in FIG. 8, the present invention is provided with a dead time compensation section 200 that calculates a dead time compensation value Δu and compensates a dead band that appears in an actual current of the inverter 106, and simultaneously provided with a temperature sensor 300 that detects a temperature t of the inverter 106. Further, a rotation sensor 301 such as a resolver is attached to the motor 20, and the present invention is also provided with a rotation angle detection section 302 for detecting a rotation angle θ from an output signal of the rotation sensor 301 and an angular velocity detection section 303 for detecting a motor angular velocity co from the rotation angle θ. The steering torque T, the velocity V, the rotation angle θ, the angular velocity ω, the current command value Iref2 and the temperature t are respectively inputted into the dead time compensation section 200. The dead time compensation section 200 calculates the dead time compensation value Δu, and the calculated dead time compensation value Δu is added to the voltage command value E in an addition section 201. A voltage command value E' (=E+Δu) that is obtained by the addition at the addition section 201, is inputted into the PWM control section 105 and PWM-controlled, and drives the motor 20 by the inverter 106. As the input to the dead time compensation section 200, it is possible to use the voltage command value E in placing of the current command value Iref2.

Figure 9:
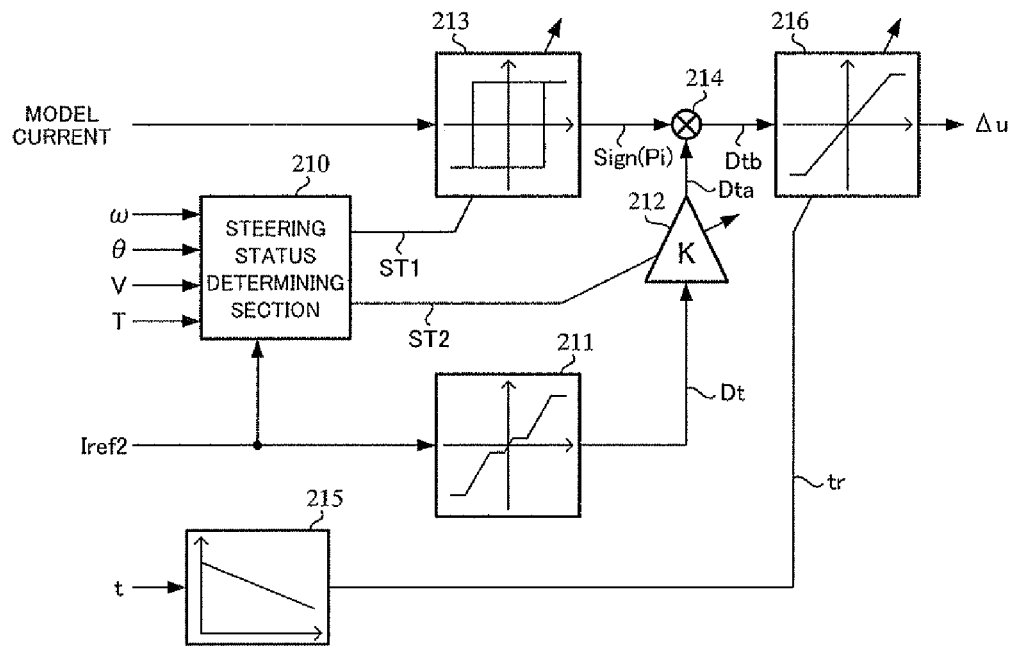
FIG. 9 is a block diagram showing a configuration example (a first embodiment) of a dead time compensation section.

Next, a configuration example (a first embodiment) of the dead time compensation section 200 will be described with reference to FIG. 9.

Figure 10:
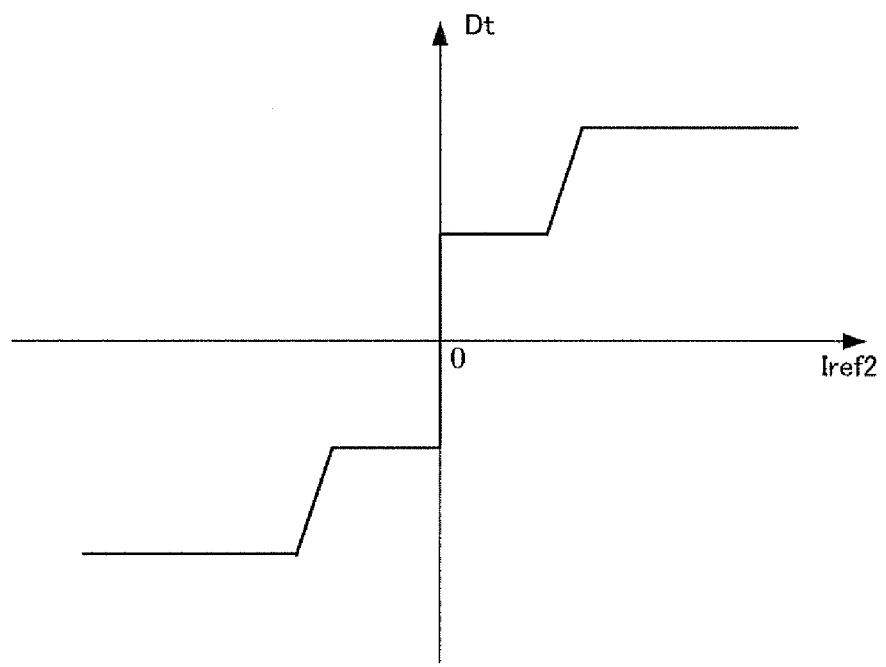
FIG. 10 is a characteristic diagram showing one example of dead time characteristics.

The current command value Iref2 from the addition section 102A, is inputted into a steering status determining section 210 and simultaneously inputted into a dead time characteristic section (a calculating section) 211. A dead time characteristic value Dt from the dead time characteristic section (the calculating section) 211, is inputted into a gain section 212. The dead time characteristic section (the calculating section) 211, outputs the dead time characteristic value Dt having a dead time characteristic of a characteristic shown in FIG. 10 with respect to the current command value Iref2. Further, a polarity determining section 213 is to determine the polarity of the input signal by characteristics with hysteresis, and the detected motor current Im, the current command value Iref2 or a model current based on the current command value Iref1 is inputted into the polarity determining section 213. Based on a steering status signal ST1 from the steering status determining section 210, the polarity determining section 213 changes a hysteresis width. By converting the current command value Iref1 by the transfer function of the following Expression 7, the model current can be obtained.

$$MR(s)=1/(1+Tc \cdot s) \qquad \text{(Expression 7)}$$

where, $Tc=1/(2\pi \cdot fc)$ holds, and "fc" is a cutoff frequency of the current control loop.

A linear delay function represented by the above Expression 7 is a model function of the current control loop that is derived from a transfer function $1/(R+s \cdot L)$ representing the motor 20 based on the PI control section 104, the PWM control section 105, the inverter 106 and the motor current detector 107.

Here, the actual motor current Im greatly includes noises, and this makes it difficult to perform a polarity determination in the vicinity of zero current. Therefore, if generating the model current of the motor 20 based on the current command value Iref1 without noises via a linear delay circuit by not using the actual motor current Im, and then determining the polarity based on the model current, it becomes more effective.

Figure 11:
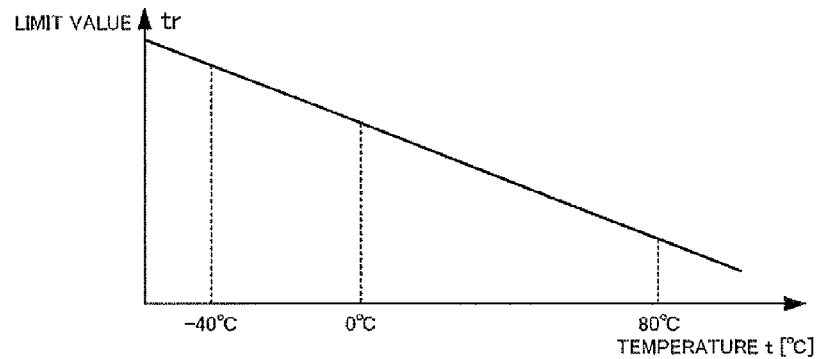
FIG. 11 is a characteristic diagram showing a characteristic example of a temperature correction limit value calculating section.
Figure 12:
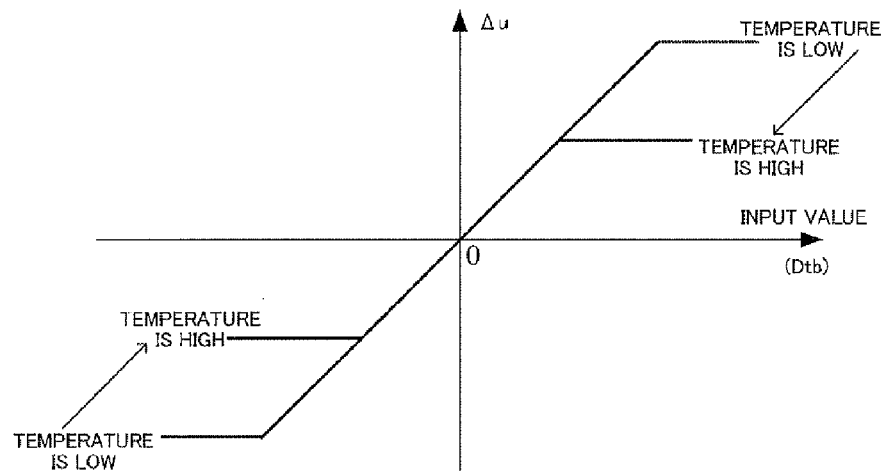
FIG. 12 is a characteristic diagram showing a characteristic example of a temperature-sensitive limiter.

The steering status determining section 210 comprises a steering wheel's release determining function and a turning/returning determining function, and the motor angular velocity ω, the steering torque T, the velocity V, the motor rotation angle θ and the current command value Iref2 are respectively inputted into the steering status determining section 210. In the case that the steering status determining section 210 determines that the steering wheel is released, the steering status signal ST1 is inputted into the polarity determining section 213. On the other hand, in the case that the steering status determining section 210 determines that the steering wheel is turned or returned, a steering status signal ST2 is inputted into the gain section 212. The polarity sign (Pi) determined by the polarity determining section 213, is inputted into a multiplication section 214, and then multiplied by a gain-adjusted dead time characteristic value Dta from the gain section 212. A dead time characteristic value with polarity Dtb that is the result "sign (Pi)·Dta" of the multiplication performed in the multiplication section 214, is inputted into a temperature-sensitive limiter 216 as a calculation processing section that outputs the dead time compensation value Au. The temperature t from the temperature sensor 300, is inputted into a temperature correction limit value calculating section 215 as a dead time temperature correction value calculating section, and calculates a temperature correction limit value tr as a dead time temperature correction value by a characteristic shown in such as FIG. 11. The calculated temperature correction limit value tr, is inputted into the temperature-sensitive limiter 216, and then the temperature-sensitive limiter 216 outputs the dead time compensation value Δu that is obtained by limiting a top and a bottom of the dead time characteristic value Dtb with polarity in accordance with a characteristic shown in FIG. 12.

Figure 13:
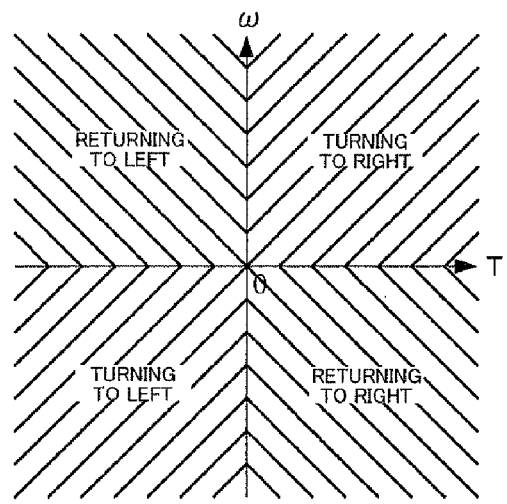
FIG. 13 is a diagram illustrating a turning/returning determination of a steering wheel.

In addition, the steering wheel's release determining function of the steering status determining section 210, outputs the steering status signal ST1 when determining a release of the steering wheel (with a driver's hands off the steering wheel) that the steering wheel does not rotate and the steering assist is not performed based on the velocity V, the motor angular velocity ω and the current command value Iref2. On the other hand, the turning/returning determining function of the steering status determining section 210, determines a turning in the case that the motor angular velocity ω and the steering torque T are the same direction, determines a returning in the case that the motor angular velocity ω and the steering torque T are different in the direction, as shown in FIG. 13, based on the motor angular velocity ω and the steering torque T, and then outputs the steering status signal ST2.

In such a configuration, the operation will be described.

The detected current Im of the motor 20, the current command value Iref2, or the model current based on the current command value Iref1 is inputted into the polarity determining section 213 with the steering status signal ST1, and its polarity is determined. The sign(Pi) that is the output of the polarity determining section 213, is outputted in a form of (+1) or (−1) as shown in the following Expression 8.

As described above, due to the noises or the like, it is very difficult to measure the actual motor current and the actual inverter current, and accurately determine the polarity. However, if using the model current and determining its polarity, the detection of the polarity becomes easy.

$$\text{sign}(Pi)=(+1) \text{ or } (-1) \qquad \text{(Expression 8)}$$

Moreover, the polarity determining section 213 is a polarity determination with the hysteresis, and sets a hysteresis width of the polarity determination in accordance with the steering status signal ST1 in the case of determining the release of the steering wheel (with a driver's hands off the steering wheel) as follows.

During release of the steering wheel (ST1=1): the hysteresis width is large

During steering of the steering wheel (ST1=0): the hysteresis width is small (Expression 9)

In the case that the deflection of the current command exceeds the hysteresis width of the dead time compensation, the output direction of the dead time compensation switches from positive to negative or from negative to positive, this causes self-excited vibrations by a closed loop including the torque control so as to become a noisy sound. This is a problem that may occurs in such a situation that the command value varies centering around almost zero ampere due to disturbances. Since the command value becomes equal to or more than a certain value in the steering status, the steering status does not cause the self-excited vibrations. Therefore, in the release status that determination of the current command value is difficult, in order to eliminate sensitivity for a variation in the command value, increasing the hysteresis width. By contrast, the steering status causes a delay of the dead time compensation and generates the torque ripple, decreasing the hysteresis width during the steering of the steering wheel.

Further, the steering wheel's release determining function within the steering status determining section 210, inputs the velocity V, the motor angular velocity ω and the current command value Iref2, and outputs a status determining signal ST=1 when the following Expression 10 holds.

0<velocity V<given value α, and motor angular velocity ω<given value β, and |current command value Iref2|<given value γ, and steering torque T<given value $T_0$, or rotation angle θ<given value $θ_0$ (Expression 10)

Moreover, the given value α is a velocity that sounds caused by self-excited vibrations can be ignored, the given value β is a small value that the noises are not detected, and the given value γ is a small value that the noises are not detected.

Further, the dead time characteristic value Dt from the dead time characteristic section 211 is inputted into the gain section 212, and is gain-adjusted in accordance with the steering status signal ST2 from the turning/returning determining function within the steering status determining section 210. The determination of the turning/returning is determined as shown in FIG. 13, since the correction is required during the turning, the gain of the gain section 212 is set to "1" in accordance with the steering status signal ST2, and since the correction is not required during the returning, the gain of the gain section 212 is set to "0" or a small value in accordance with the steering status signal ST2.

In this way, the dead time characteristic value Dta that is gain-adjusted in accordance with the steering status signal ST2 from the turning/returning determining function, is polarity-assigned in accordance with the polarity (positive or negative) from the polarity determining section 213 in the multiplication section 214 and inputted into the temperature-sensitive limiter 216. Then, the temperature-sensitive limiter 216 outputs the dead time compensation value Δu based on the characteristic shown in FIG. 12 in accordance with the temperature correction limit value tr from the temperature correction limit value calculating section 215. The dead time compensation value Δu calculated in such a way, is added to the voltage command value E that is the output of the PI control section 104 shown in FIG. 2, in the addition section 201. The purpose of adding the temperature-sensitive dead time compensation value Δu to the voltage command value E, is to add the compensation value Δu improving the voltage and the current distortions and the torque ripple that are caused by the dead time for preventing top/bottom arm short to a basic control indicated by the voltage command value E so as to control.

Figure 14:
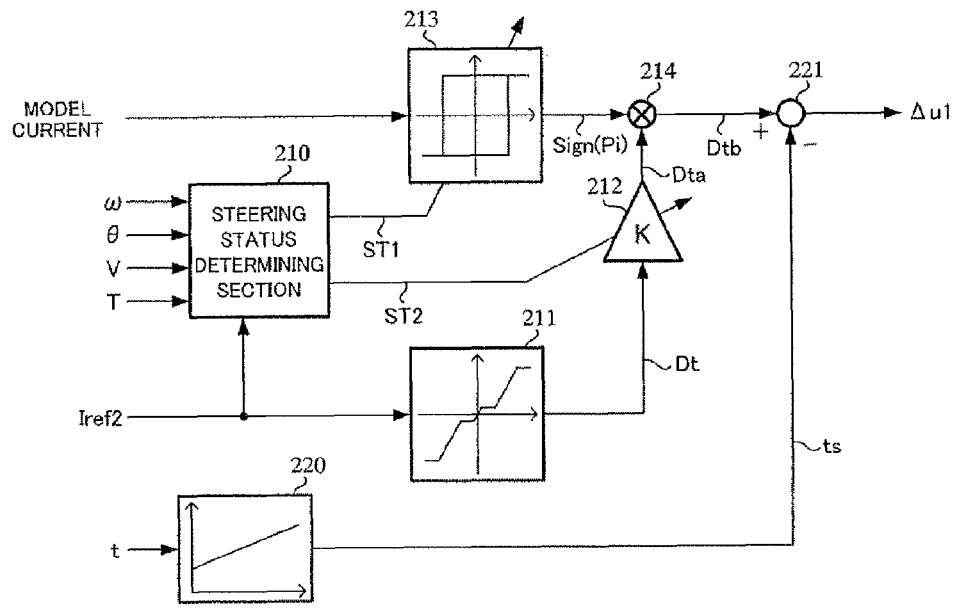
FIG. 14 is a block diagram showing a configuration example (a second embodiment) of the dead time compensation section.

Next, another configuration example (a second embodiment) of the dead time compensation section 200 will be described with reference to FIG. 14 corresponding to FIG. 9. With respect to the configurations that are the same as FIG. 9, the identical reference numerals are given without adding the explanations.

Figure 15:
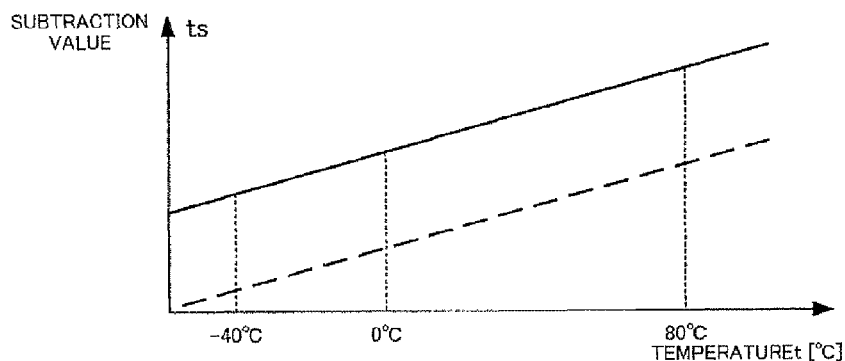
FIG. 15 is a characteristic diagram showing a characteristic example of a temperature correction subtraction value calculating section.
Figure 16:
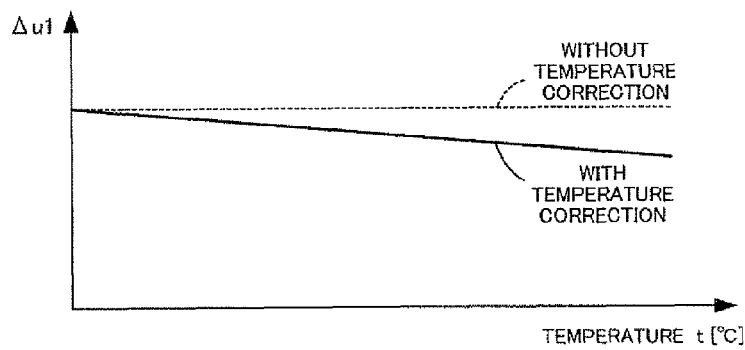
FIG. 16 is a characteristic diagram showing one example of compensation value variations with temperature.

This embodiment is provided with a temperature correction subtraction value calculating section 220 that calculates a temperature correction subtraction value ts as the dead time temperature correction value in accordance with the temperature t from the temperature sensor 300 as the dead time temperature correction value calculating section, and simultaneously is provided with a subtraction section 221 that subtracts the temperature correction subtraction value ts from the dead time characteristic value Dtb with the polarity from the multiplication section 214 as the calculation processing section. The subtraction section 221 subtracts the temperature correction subtraction value ts from the dead time characteristic value Dtb with the polarity and outputs a temperature-sensitive dead time compensation value Δu1. A relationship between the temperature t and the temperature correction subtraction value ts in the temperature correction subtraction value calculating section 220 is a solid line or a dashed line shown in FIG. 15. By subtracting the temperature correction subtraction value ts from the dead time characteristic value Dtb with the polarity in the subtraction section 221, it is possible to perform a temperature correction shown in FIG. 16. A solid line of FIG. 16 is a characteristic of the present invention, and a dashed line of FIG. 16 is a characteristic in the case of not performing a temperature correction.

Figure 17:
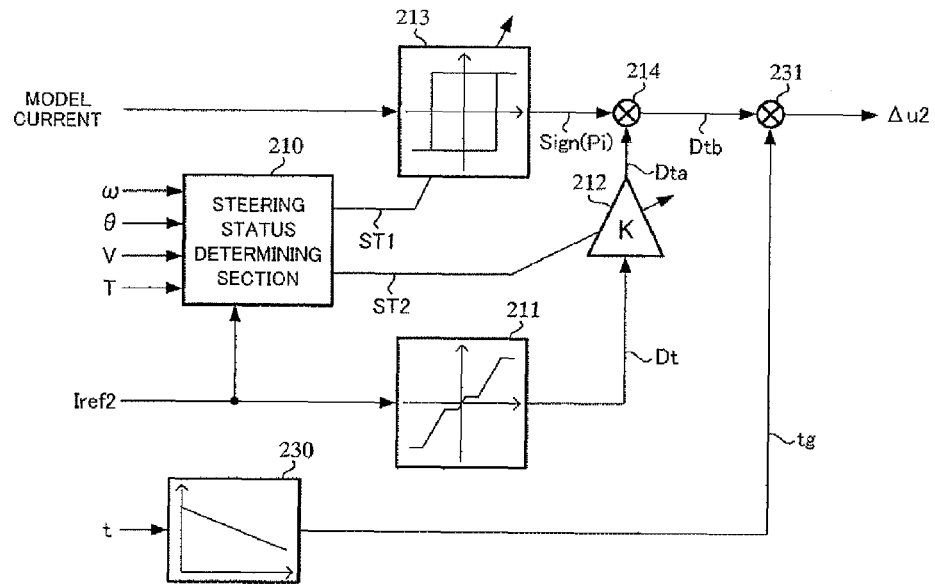
FIG. 17 is a block diagram showing a configuration example (a third embodiment) of the dead time compensation section.

Moreover, another configuration example (a third embodiment) of the dead time compensation section 200 will be described with reference to FIG. 17 corresponding to FIG. 9. With respect to the configurations that are the same as FIG. 9, the identical reference numerals are given without adding the explanations.

Figure 18:
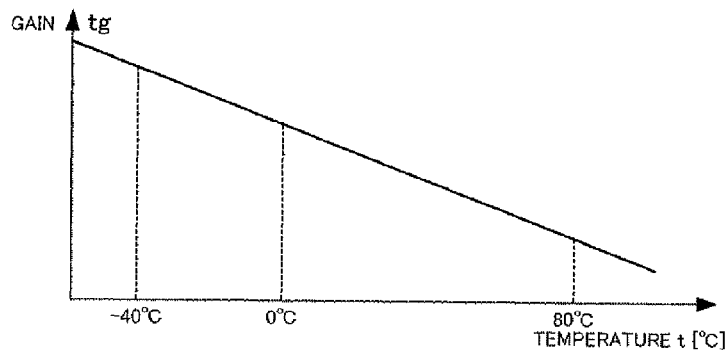
FIG. 18 is a characteristic diagram showing a characteristic example of a temperature correction gain calculating section.
Figure 19:
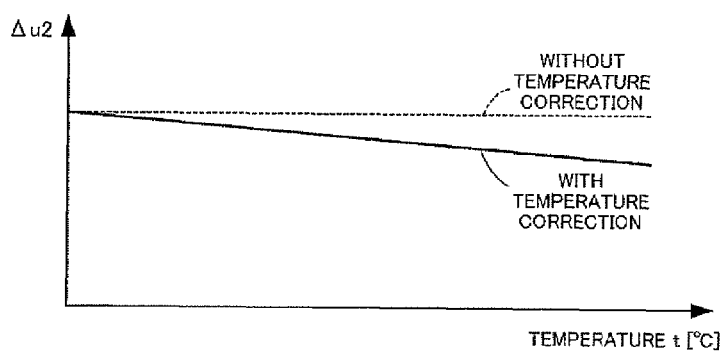
FIG. 19 is a characteristic diagram showing one example of compensation value variations with temperature.

This embodiment is provided with a temperature correction gain calculating section 230 that calculates a temperature correction gain tg as the dead time compensation value in accordance with the temperature t from the temperature sensor 300 as the dead time compensation value calculating section, and simultaneously is provided with a multiplication section 231 that multiplies the dead time characteristic value Dtb with the polarity from the multiplication section 214 by the temperature correction gain tg as the calculation processing section. The multiplication section 231 multiplies the dead time characteristic value Dtb with the polarity by the temperature correction gain tg and outputs a temperature-sensitive dead time compensation value Δu2. FIG. 18 shows a relationship between the temperature t and the temperature correction gain tg in the temperature correction gain calculating section 230. By multiplying the dead time characteristic value Dtb with the polarity by the temperature correction gain tg in the multiplication section 231, it is possible to perform a temperature correction shown in FIG. 19. A solid line of FIG. 19 is a characteristic of the present invention, and a dashed line of FIG. 19 is a characteristic in the case of not performing a temperature correction.

Moreover, although the above are descriptions about a three-phase motor, in the same way, it is possible to apply the present invention to other motor such as a two-phase motor.

EXPLANATION OF REFERENCE NUMERALS 1 steering wheel
2 column shaft (steering shaft)
10 torque sensor
12 velocity sensor
20 motor
100 control unit
110 compensation section
200 dead time compensation section
210 steering status determining section
211 dead time characteristic section (calculating section)
212 gain section
213 polarity determining section
215 temperature correction limit value calculating section
216 temperature-sensitive limiter
220 temperature correction subtraction value calculating section
230 temperature correction gain calculating section
300 temperature sensor
301 rotation sensor
302 rotation angle detection section
303 angular velocity detection section

The invention claimed is:
1. A control device for an electric power steering apparatus configured to control a motor providing a steering mechanism with a steering assist force by means of an inverter based on current command value calculated based on a steering torque generated in a steering shaft and a voltage command value from a current control section inputting said current command value, comprising:
a dead time characteristic section configured to calculate a dead time characteristic value based on said current command value;
a steering status determining section configured to output a first steering status signal by determining of a steering wheel's release, and configured to output a second steer- ing status signal by determining of determining a turning/returning of said steering wheel;

a gain section configured to vary a gain of said dead time characteristic value in accordance with said second steering status signal;

a polarity determining section configured to input a detected current of said motor, said current command value, or a model current based on said current command value, and configured to determine a polarity of inputted said detected current, said current command value, or said model current in accordance with said second steering status signal;

a temperature sensor configured to detect a temperature of said inverter;

a dead time temperature correction value calculating section configured to calculate a dead time temperature correction value corresponding to said temperature; and a calculation processing section configured to calculate a dead time compensation value with polarity by multiplying an output of said gain section by a polarity determined at said polarity determining section, and configured to output a dead time compensation value by processing said dead time temperature correction value with respect to said dead time compensation value with polarity, wherein a dead time of said inverter is compensated by adding said dead time compensation value to said voltage command value.

2. A control device for an electric power steering apparatus according to claim 1, wherein
at a time of a high temperature of said inverter, decreasing said dead time compensation value, and at a time of a low temperature of said inverter, increasing said dead time compensation value.

3. A control device for an electric power steering apparatus according to claim 1, wherein
said dead time temperature correction value calculating section comprises a temperature correction limit value calculating section configured to calculate a temperature correction limit value of a characteristic decreasing in accordance with an increasing of said temperature, and
said calculation processing section comprises a temperature-sensitive limiter which is sensitive to said temperature correction limit value.

4. A control device for an electric power steering apparatus according to claim 1, wherein
said dead time temperature correction value calculating section comprises a temperature correction subtraction value calculating section configured to calculate a temperature correction subtraction value of a characteristic increasing in accordance with an increasing of said temperature, and
said calculation processing section comprises a subtraction section which subtracts said temperature correction subtraction value.

5. A control device for an electric power steering apparatus according to claim 1, wherein
said dead time temperature correction value calculating section comprises a temperature correction gain calculating section configured to calculate a temperature correction gain of a characteristic decreasing in accordance with an increasing of said temperature, and
said calculation processing section comprises a multiplication section configured to multiply said temperature correction gain.

6. A control device for an electric power steering apparatus according to claim 2, wherein
said dead time temperature correction value calculating section comprises a temperature correction limit value calculating section configured to calculate a temperature correction limit value of a characteristic decreasing in accordance with an increasing of said temperature, and
said calculation processing section comprises a temperature-sensitive limiter which is sensitive to said temperature correction limit value.

7. A control device for an electric power steering apparatus according to claim 2, wherein
said dead time temperature correction value calculating section comprises a temperature correction subtraction value calculating section configured to calculate a temperature correction subtraction value of a characteristic increasing in accordance with an increasing of said temperature, and
said calculation processing section comprises a subtraction section configured to subtract said temperature correction subtraction value.

8. A control device for an electric power steering apparatus according to claim 2, wherein
said dead time temperature correction value calculating section comprises a temperature correction gain calculating section configured to calculate a temperature correction gain of a characteristic decreasing in accordance with an increasing of said temperature, and
said calculation processing section comprises a multiplication section configured to multiply said temperature correction gain.

* * * * *